(12) United States Patent     (10) Patent No.: US 8,347,442 B2
Peacocke     (45) Date of Patent: Jan. 8, 2013

(54) BARBEQUE GRILL CLEANING DEVICE

(76) Inventor: Bernard Micael Peacocke, Cape Town (ZA)

( * ) Notice: Subject to any disclaimer, the term of this patent is extended or adjusted under 35 U.S.C. 154(b) by 0 days.

(21) Appl. No.: 13/203,267

(22) PCT Filed: Feb. 2, 2010

(86) PCT No.: PCT/ZA2010/000011
§ 371 (c)(1),
(2), (4) Date: Aug. 25, 2011

(87) PCT Pub. No.: WO2010/099553
PCT Pub. Date: Sep. 2, 2010

(65) Prior Publication Data
US 2011/0302729 A1     Dec. 15, 2011

(51) Int. Cl.
*A46B 13/00*     (2006.01)
(52) U.S. Cl. .................. 15/21.1; 15/77; 15/160; 15/246
(58) Field of Classification Search .................. 15/21.1, 15/77, 246, 246.5, 160; 126/25 R, 41 R, 126/152 R
See application file for complete search history.

(56) References Cited

U.S. PATENT DOCUMENTS

| | | | | |
|---|---|---|---|---|
| 2,739,429 A * | 3/1956 | Peterson | ...................... | 15/230.13 |
| 4,226,255 A | 10/1980 | Tarrer | | |
| 4,490,871 A * | 1/1985 | Martin | ............................. | 15/21.1 |
| 4,662,025 A * | 5/1987 | Fritsch | ............................. | 15/246 |
| 4,979,255 A * | 12/1990 | Buchnag | ............................. | 15/4 |
| 5,605,143 A * | 2/1997 | Hebert et al. | ................ | 126/41 R |
| 5,655,435 A * | 8/1997 | Rachesky | ......................... | 99/339 |
| 5,735,014 A | 4/1998 | Noga | | |
| 6,098,229 A * | 8/2000 | Ward | .............................. | 15/21.1 |
| 6,431,165 B1 | 8/2002 | Dow et al. | | |
| 7,000,528 B2 * | 2/2006 | Home | .............................. | 99/339 |
| 7,562,654 B2 * | 7/2009 | Chung | ......................... | 126/25 A |
| 2005/0086754 A1 | 4/2005 | Dalias | | |
| 2008/0047080 A1 * | 2/2008 | Smith | .............................. | 15/21.1 |
| 2011/0174342 A1 | 7/2011 | Friedrich | | |

FOREIGN PATENT DOCUMENTS

| | | |
|---|---|---|
| AT | 10103 U1 | 9/2008 |
| DE | 19955430 A1 | 5/2001 |
| FR | 2684317 A1 | 6/1993 |
| GB | 2365322 A | 2/2002 |
| WO | 0138015 A1 | 5/2001 |

OTHER PUBLICATIONS

International Search Report for PCT/ZA2010/000011, Completed by the Austrian Patent Office on Jun. 4, 2010, 3 Pages.

* cited by examiner

*Primary Examiner* — Mark Spisich
*Assistant Examiner* — Michael Jennings
(74) *Attorney, Agent, or Firm* — Brooks Kushman P.C.

(57) ABSTRACT

A barbeque grill cleaning device including a soaking container, in which the grill may be submerged in a cleaning liquid, and a rotary scrubbing head for scrubbing the grill while positioned in the soaking container. The barbeque grill cleaning device includes: a container defining a cavity shaped and sized for receiving a barbeque grill therein; and a scrubbing head for scrubbing the barbeque grill, the scrubbing head is rotatable relative to the container; such that the cleaning of the barbeque grill is aided by a scrubbing action as a result of contact between the barbeque grill and the rotating scrubbing head.

12 Claims, 10 Drawing Sheets

BARBEQUE GRILL CLEANING DEVICE

CROSS-REFERENCE TO RELATED APPLICATION

This application is the U.S. national phase of PCT Appln. No. PCT/ZA2010/000011 filed Feb. 2, 2010 which claims priority to South African application 2009/01379 filed Feb. 26, 2009, the disclosures of which are incorporated in their entirety by reference herein.

BACKGROUND OF THE INVENTION

THIS invention relates to a barbeque grill cleaning device. More specifically, the invention relates to a barbeque grill cleaning device comprising a soaking container, in which the grill may be submerged in a cleaning liquid, and a rotary scrubbing head for scrubbing the grill while positioned in the soaking container.

Many methods and/or devices for cleaning barbeque grills are known. The most common of these methods is cleaning the grill using an onion. The method requires a cleaner to rub the onion over the grill while over an open fire so that the grit and grime baked onto the grill from its previous use can be burnt off. Although this is currently the most popular and cheapest way of cleaning a barbeque grill, it requires the cleaner's hand to come into close proximity with the hot fire, which is uncomfortable and may cause burning.

Common devices for cleaning barbeque grills are brushes or sponges, used in combination with a cleaning liquid and water. Although more effective than the onion method, the cleaning of the grill is generally an unpleasant experience, requiring the cleaner to hold the dirty grill while cleaning, often resulting in the cleaner becoming sopping wet and covered in grit and grime as a result of the cleaner's brushing action on the grill.

Better devices have more recently been introduced into the market. The most common of these devices consists of an upright standing container having an open top end through which the grill can be introduced into the container. A plurality of brushes or bristles are attached to the inside of the container which scrub the grill as it is reciprocally moved up and down in the container, much in the same way a golf ball cleaner works. Although more effective, these device also have their disadvantages. Firstly, the brushes and bristles in the devices become dirty and wear over time and generally are not removable for the purposes of cleaning or replacing. Secondly, the reciprocal action required to clean the grill is cumbersome and tiring on the cleaner.

It is accordingly an object of the present invention to provide a barbeque grill cleaning device that more effectively cleans barbeque grills.

The term "grill" as used in the specification is to be understood to refer to a grid or gridiron cooking utensil used for cooking food over an open fire. Further, the term "drum portion" as used in the specification is to be understood to refer to that portion of a barbeque in which a fuel, such as charcoal or wood, for making a fire is contained.

SUMMARY OF THE INVENTION

According to the invention there is provided a barbeque grill cleaning device including:
  a container defining a cavity shaped and sized for receiving a barbeque grill therein; and
  a scrubbing head for scrubbing the barbeque grill, the scrubbing head being rotatable relative to the container; such that the cleaning of the barbeque grill is aided by a scrubbing action as a result of contact between the barbeque grill and the rotating scrubbing head.

The container typically comprises a base, on which the grill is supportable, and peripheral side walls extending from the base, the cavity for receiving the barbeque grill is defined by the base and the side walls, and further wherein the cavity comprises a volume sufficient to submerge the grill, received in the cavity in use, in a cleaning liquid thereby aiding the cleaning thereof.

The container may comprise one or more grill handle receiving formations for receiving one or more handles extending from at least a first side of the grill, the grill being supportable on the base between a first orientation, wherein at least a portion of a second side of the grill is supported by the base thereby exposing the first side of the grill to the scrubbing action of the scrubbing head, and a second orientation, wherein at least a portion of the first side of the grill is supported by the base thereby exposing the second side of the grill to the scrubbing action of the scrubbing head, the handles of the grill positioned in the container in the second orientation being receivable within the grill handle receiving formations. The grill handle receiving formations are generally one or more recesses defined in the base of the container.

The container may also comprise grill engaging formations for engaging at least a portion of the grill for the purposes of restricting the rotation of the grill relative to the container as a result of the force imparted onto the grill by the scrubbing action of the scrubbing head. The grill engaging formations typically extend outwardly from the base of the container, the grill engaging formations being engageable with one or more of the cross bars making up the grill.

Further, the container is generally supportable in or on the drum portion of a barbeque, of the type of barbeque having a drum portion and a barbeque cover for covering the open upper end of the drum portion. In one embodiment, the container is supportable by the force of friction as a result of the direct contact between the container and the inner side walls of the drum portion of the barbeque. In another embodiment, the container comprises support formations co-operative with formations extending inwardly from the inner side walls of the drum portion on which the grill is normally supportable. In yet another embodiment, the container comprises support formations co-operative with a rim of the open upper end of the drum portion of the barbeque.

The support formations may be one or more support tabs or support lips extending radially outwardly from the side walls of the container. The support formations are typically a recess defined between the side walls of the container and the support lips extending there-from, in which the rim of the open upper end of the drum portion of the barbeque is receivable.

The container may comprise a barbeque cover receiving formation for receiving the open bottom end of the barbeque cover thereby allowing the container to be housed substantially within the barbeque, that is wherein the majority of the container is housed within the barbeque. The container may also comprise one or more handles.

The scrubbing head may be rotatable about and axially movable along an axis of rotation being substantially perpendicular with the base of the container, the scrubbing head being axially movable along the axis of rotation between a first position, wherein the scrubbing head is located near the container, and a second position wherein the scrubbing head is remote from the container thereby enabling the introduction and/or removal of the grill there-from, and further wherein the scrubbing force imparted to the grill by the scrubbing head positioned in the first position is variable by axial movement of the scrubbing head along the axis of rotation.

The angle of the axis of rotation relative to the base is generally between 80 degrees and 100 degrees. Typically, the angle of the axis of rotation relative to the base is between 85 degrees and 95 degrees. Preferably, the angle of the axis of rotation relative to the base is about 90 degrees.

In one embodiment, the scrubbing head may be rotatable about and axially movable along a shaft comprising a first fixed end and a second free end, the first fixed end being fixed to the base of the container or the scrubbing head and the second free end being engageable with a correspondingly shaped primary shaft receiving formation in the other of the base of the container or the scrubbing head. The shaft is typically dimensioned to pass between the cross bars making up the grill or defines an open ended slot at the second free end thereof shaped and sized to receive at least a portion of the cross bars making up the barbeque grill, such that the second free end of the shaft, extending in use through the cross bars, is receivable in the primary shaft receiving formation, the primary shaft receiving formation being a bore. The barbeque grill cleaning device may further include a driving member for imparting rotary motion to the scrubbing head. The shaft is typically fixed to, or the primary shaft receiving formation is defined in, a central body of the scrubbing head.

In another embodiment, the barbeque grill cleaning device generally includes a scrubbing head assembly comprising a housing member for housing the scrubbing head and further defining a secondary shaft receiving formation, the scrubbing head being rotatable and axially movable relative to the housing member on a shaft extending from the scrubbing head and received within the secondary shaft receiving formation, the shaft being connected at an opposite end to a driving member for imparting rotary motion to the scrubbing head, thereby capturing the housing member between the driving member and the scrubbing head. The scrubbing head assembly is typically movable relative to the container between a first position, wherein the scrubbing head assembly is located on or near the container, and a second position wherein the scrubbing head assembly is remote from the container thereby enabling the introduction and/or removal of the grill there-from, and further wherein the scrubbing force imparted to the grill by the scrubbing head positioned in the first position is variable by axial movement of the scrubbing head along the axis of rotation.

Further, the housing member may comprise a container engaging formation for correspondingly engaging with the barbeque cover receiving formation of the container and a secondary barbeque cover receiving formation for receiving the open bottom end of the barbeque cover thereby allowing the container and housing member to be housed substantially within the barbeque, that is wherein the majority of the container and housing member is housed within the barbeque. The housing member is normally a lid for covering the open end of the container and the secondary shaft receiving formation is a bore. The shaft generally extends from a central body of the scrubbing head.

The scrubbing head may further comprise of one or more scrubbing arms extending radially outwardly from the central body. Each of the scrubbing arms generally comprise a plurality of bristles positioned in one or more bristle rows. The bristles are typically part of one or more bristle heads being releasably attachable to each of the scrubbing arms, thereby allowing efficient replacement of worn bristle heads and/or efficient cleaning of dirty bristle heads. The releasable attachment formations may be made up of a group of releasable attachment formations consisting of clipping formations and/ or sliding formations. Further, the bristles may be substantially parallel to the axis of rotation and directed in use toward the grill.

The driving member is typically part of a manual or motorised drive means. Where the driving member is part of a manual drive means, the driving member may be a driving handle.

In yet another embodiment, the one or more scrubbing arms may be a flat disc shaped member, the central body being positioned centrally in relation to the flat disc shaped member.

The barbeque grill cleaning device may be manufactured from or coated in a hard wearing material capable of withstanding temperatures of up to about 120 degrees Celsius without becoming damaged. The barbeque grill cleaning device is normally manufactured from a metallic material, a thermoplastic-like material, a plastic-like material or any combination thereof. The bristles may be manufactured from synthetic polymers or brass. The barbeque grill cleaning device is typically circular in shape.

BRIEF DESCRIPTION OF THE DRAWINGS

The invention will now be described in more detail, by way of example only, with reference to the accompanying drawings in which.

DESCRIPTION OF THE ILLUSTRATED EMBODIMENTS

Figure 1:
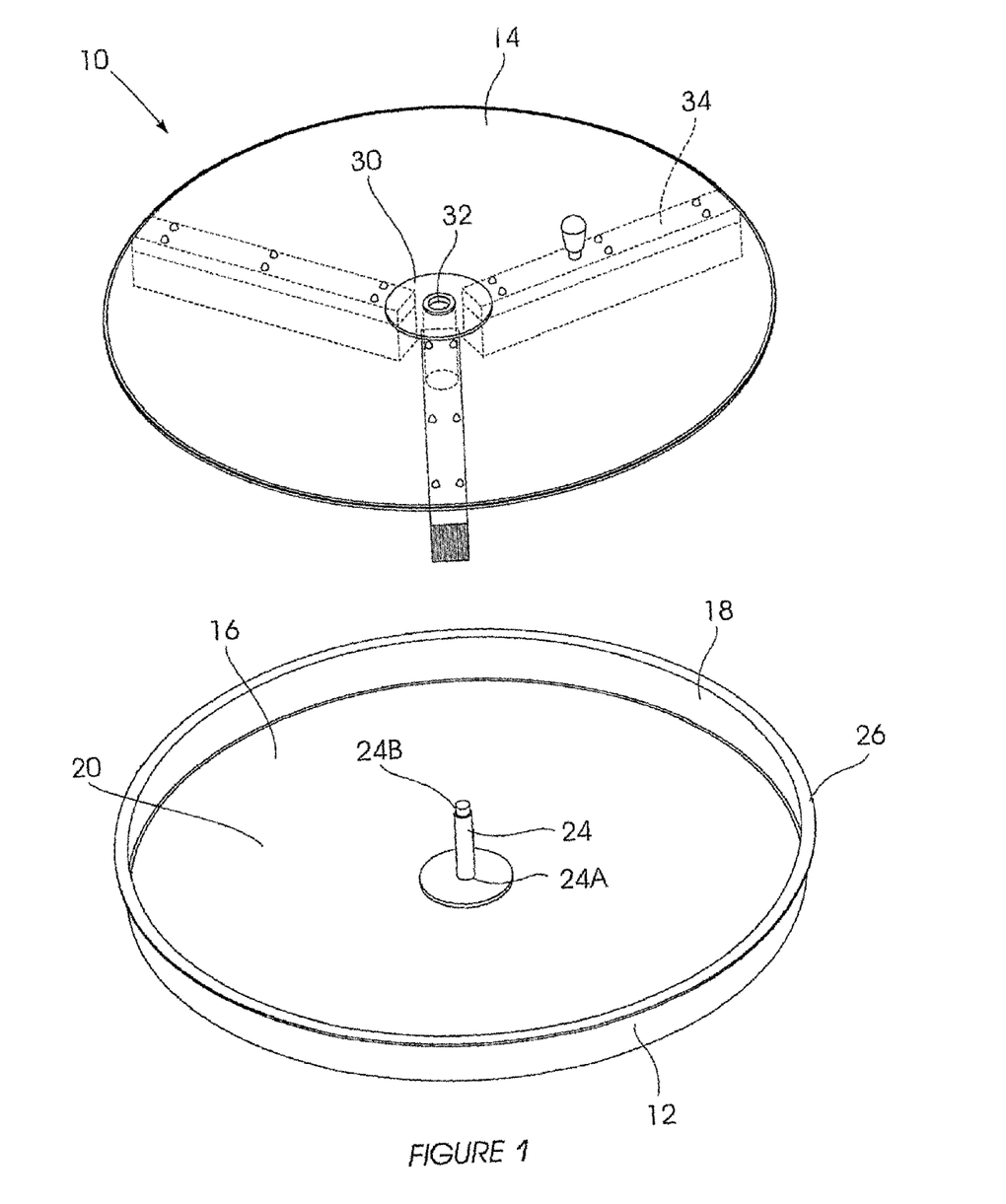
FIG. 1 shows a perspective view of a container and a scrubbing head of a barbeque grill cleaning device in accordance with the invention.

A barbeque grill cleaning device according to a preferred embodiment of the invention is designated generally with the reference numeral 10 in FIG. 1. The barbeque grill cleaning device 10 comprises a container 12 and a scrubbing head 14.

Figure 2:
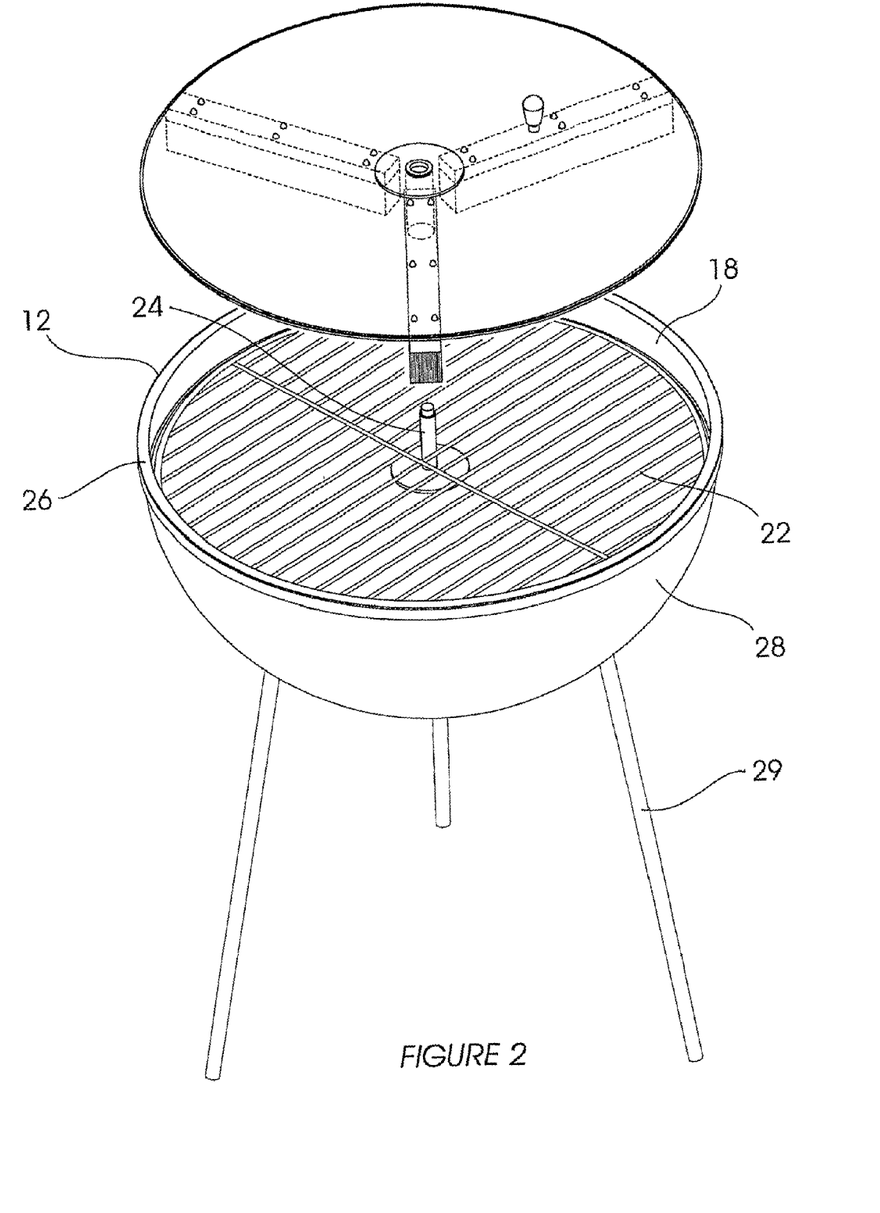
FIG. 2 shows a perspective view of the container of the barbeque grill as it would, in use, be positioned in the barbeque, with the barbeque grill positioned therein.

The container 12 is generally circularly shaped and comprises of a base 16, peripheral side walls 18 extending from the base 16 and an open top. With reference to FIG. 1 and FIG. 2, the base 16 and side walls 18 jointly define a cavity 20 shaped and sized to receive a barbeque grill 22. The cavity 20 comprises a volume sufficient to submerge a grill 22, received in use therein, in a cleaning liquid (not shown) thereby aiding the cleaning of the grill 22.

The container 12 includes a shaft 24 representing the axis of rotation on which the scrubbing head 14 is rotatably and slidably mountable. The shaft 24 comprises of a first end 24A, attached to the centre of the base 16 of the container 12, and a second free end 24B, extending upwardly into the cavity 20. The shaft 24 is generally mounted perpendicularly with respect to the base 16, but due to manufacturing misalignment, may be angled at any angle between 80 degrees and 100 degrees with respect to the base 16. The container 12 also comprises of a support formation in the form of a lip 26, extending around the outer periphery of the container 12, so as to allow the container 12 to be supported on the rim of a drum portion 28 of a barbeque 29. Although the support formation has been illustrated in the accompanying drawings as a lip 26, it will be appreciated that the support formation may take many other forms. For example, the support formations may be co-operative with formations extending inwardly from the inner side walls of the drum portion 28 on which the grill 22 is normally supportable. Alternatively, the container 12 may be supported in the drum portion 28 by direct contact between the container 12 and either the grill's supporting formations or the inner side walls (by friction) of the drum portion 28. Further, and although not shown, the container 12 may comprise a barbeque cover receiving formation for receiving the open bottom end of a barbeque cover thereby allowing the container 12 to be housed substantially within the barbeque 29, that is wherein the majority of the container 12 is housed within the barbeque 29. The container 12 generally also comprises one or more handles (not shown) to aid its handling.

The container 12 is typically manufactured from, or coated in, a hard wearing material, such as an epoxy resin, capable of withstanding temperatures of up to about 120 degrees Celsius without becoming damaged. The container 12 is normally manufactured from a metallic material, a thermoplastic-like material, a plastic-like material or any combination thereof.

Figure 3:
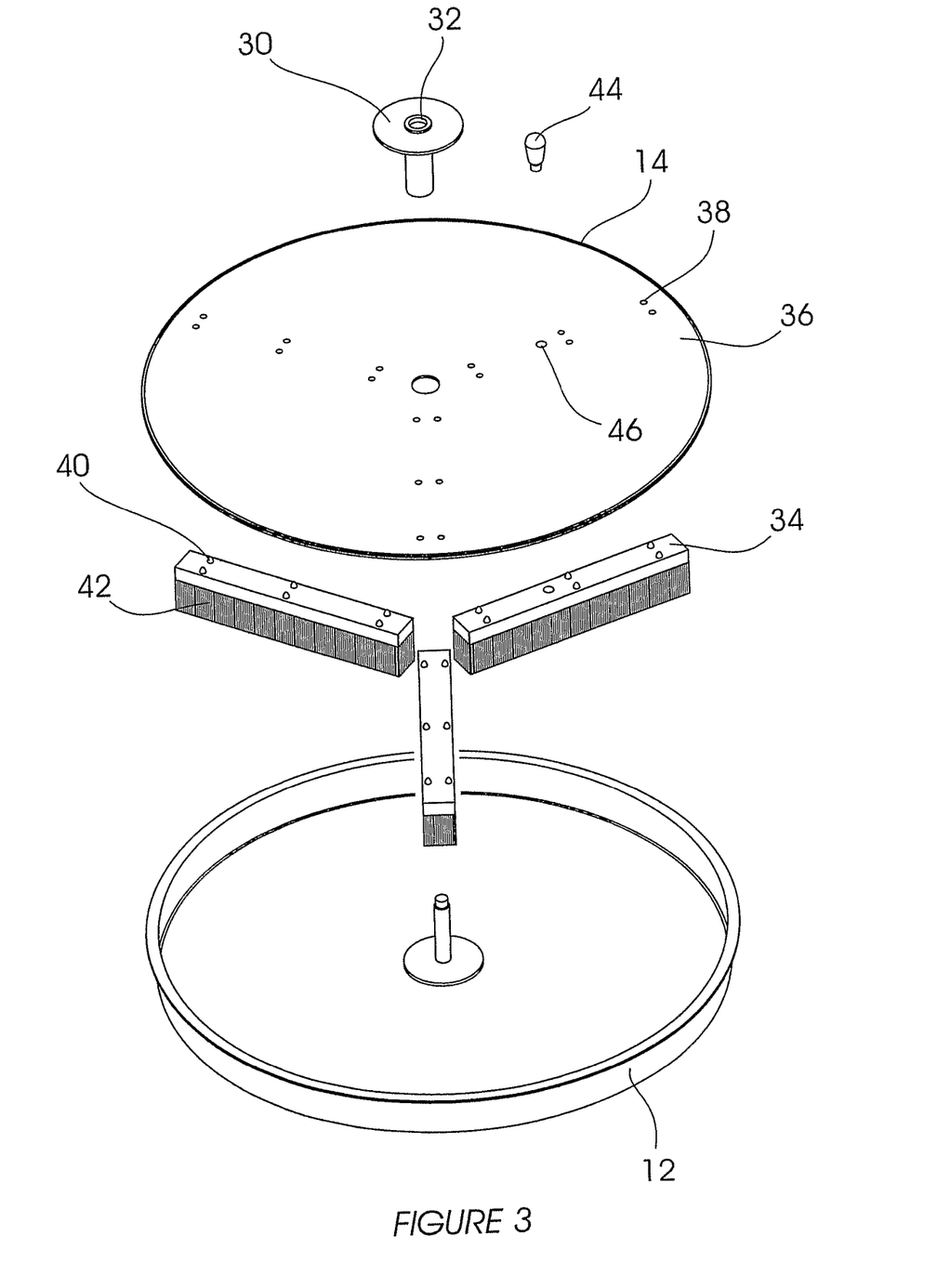
FIG. 3 shows an exploded perspective view of the barbeque grill cleaning device of FIG. 1 and FIG. 2.

With specific reference to FIG. 1 and FIG. 3, the scrubbing head 14 comprises of a central body 30 defining a primary shaft receiving formation in the form of a primary shaft receiving bore 32. The primary shaft receiving bore 32 is sized and shaped for receiving the free end 24B of the shaft 24. The scrubbing head 14 further comprises a plurality of bristle heads 34 releasably attached to a disc shaped scrubbing arm 36 extending radially outwardly from the central body. Although the scrubbing arm 36 has been illustrated as a disc shaped member, it will be appreciated that the scrubbing arm 36 may be a plurality of independent arms extending radially outwardly from the central body 30.

Typically the releasable attachment formations are a plurality of apertures 38 defined in the scrubbing arm 36, correspondingly engageable with clipping formations 40 extending upwardly from a side of the bristle heads 34 opposite to the side from which the bristles 42 extend. There may be any number of bristles heads 34, but preferably there are three bristle heads 34, spaced apart relative to one another, by 120 degrees. Although the releasable attachment formations 38, 40 have been illustrated as clipping formations, it will be appreciated that the releasable attachment formations may be sliding formations or any other type of formation that allows the easy release of the bristle heads 34 from the scrubbing arm 36.

The scrubbing head 14 further comprises a drive handle 44, attached to the scrubbing arm 36 via a drive handle attachment aperture 46. The axis of rotation of the drive handle 44, is substantially parallel (i.e. within 0 to 20 degrees relative to the axis of rotation) to and spaced away from the axis of rotation of the scrubbing head 14 such that a rotational motion imparted to the drive handle 44 is transmittable to the scrubbing head 14. It will be appreciated that the drive handle 44 may be positioned at any location on the scrubbing head 14. Further, it will be appreciated that rotational motion may be accomplished with a motorised rather than a manual system.

The scrubbing head 14 is typically manufactured from or coated in a hard wearing material, such as an epoxy resin, capable of withstanding temperatures of up to about 120 degrees Celsius without becoming damaged. The central body 30 and scrubbing arm 36 are generally manufactured from a metallic material, a thermoplastic-like material, a plastic-like material or any combination thereof. The bristles 42 are typically manufactured from a suitable durable and abrasive material, such as nylon or brass, and the drive handle 44 from wood or plastic.

Figure 4:
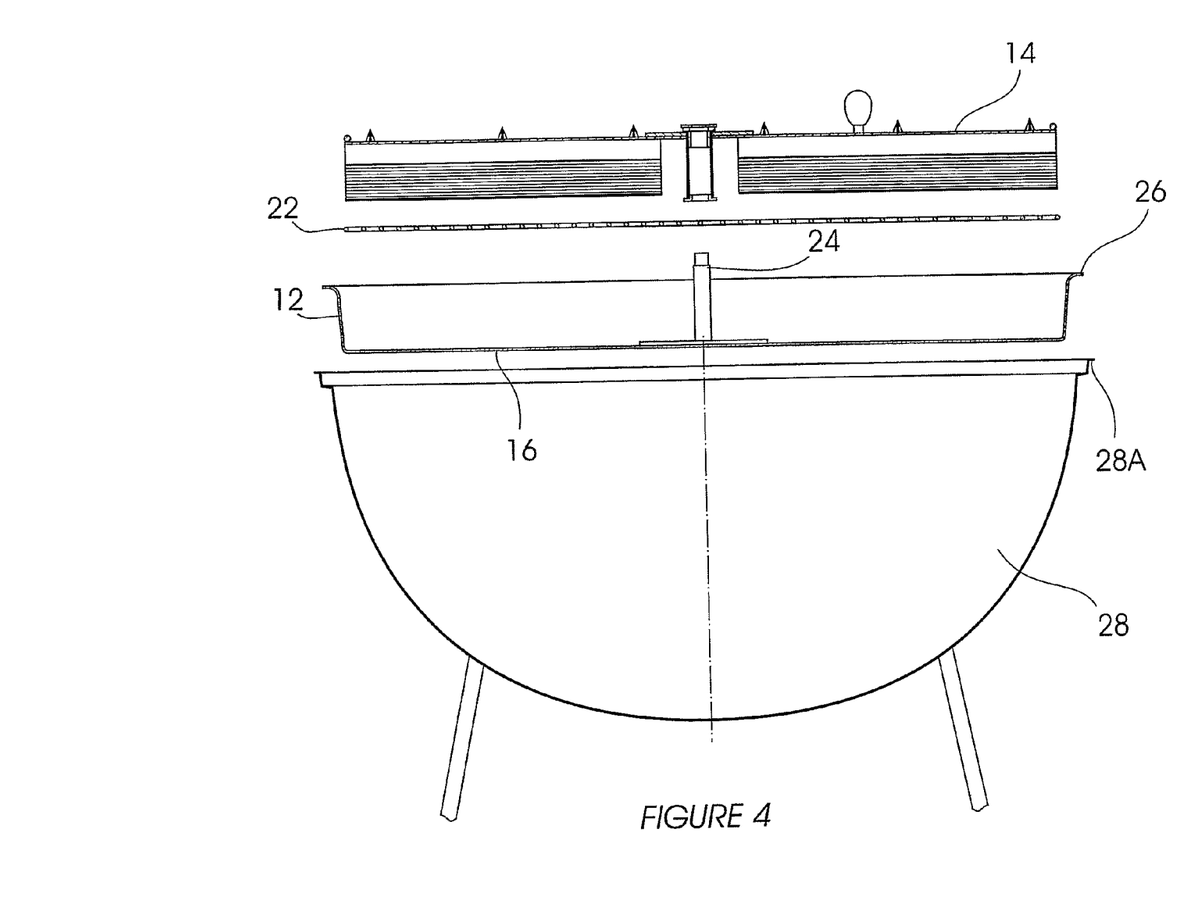
FIG. 4 shows a cross sectional side view of barbeque grill cleaning device as it would be positioned, for the purposes of use, relative to a barbeque and a barbeque grill.

In use, and with specific reference to FIG. 4, the scrubbing head 14 is removed from the container 12 thereby providing access to the container cavity 20 for the grill 22 and a cleaning liquid (not shown) to be introduced therein. The grill 22 is positionable in the cavity 20 in a horizontal orientation and submerged in the cleaning liquid, thereby soaking the grill 22 and loosening any grit thereon.

To make the barbeque grill cleaning device 10 ergonomically friendly to use, the container 12 is typically positioned in the drum portion 28 of a barbeque 29 thereby placing it at a comfortable height for a user. The container 12 is supported in this positioned by co-operation between the rim 28A of the drum portion 28 of a barbeque 29 and the support formations 26 of the container 12.

Figure 5:
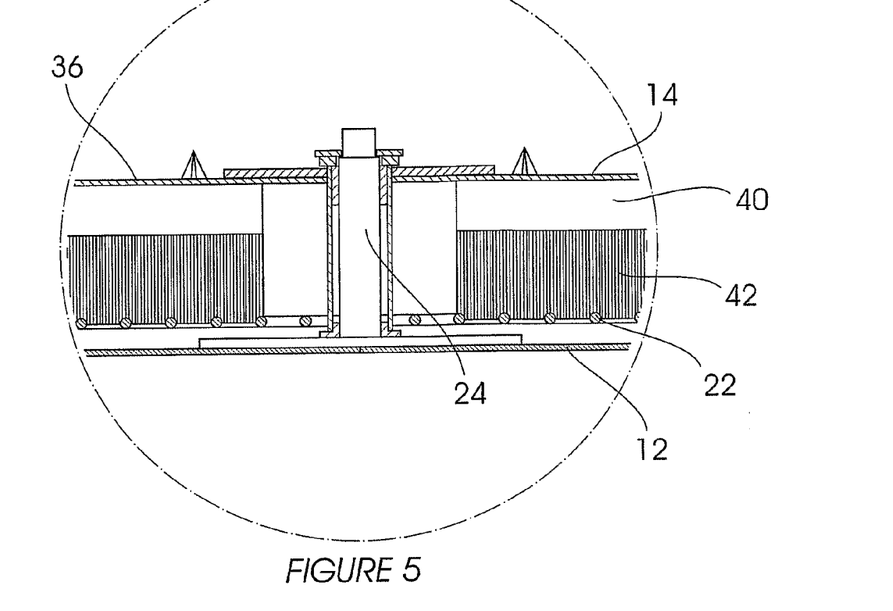
FIG. 5 shows an enlarged side view of the mounting arrangement of the scrubbing head relative to the container.
Figure 6:
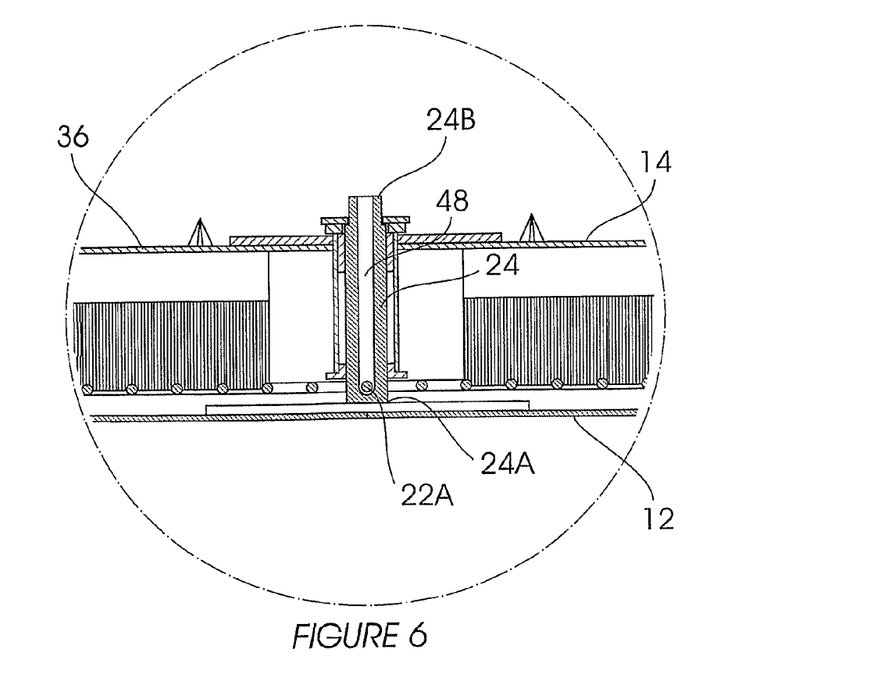
FIG. 6 shows an enlarged side view of an alternative mounting arrangement of the scrubbing head relative to the container.

With reference now to FIG. 4 and FIG. 5, the second end 24B of the shaft 24 extends through the cross bars 22A of the barbeque grill 22, thereby enabling the scrubbing head 14 to be mounted thereon. In another embodiment, and with reference to FIG. 4 and FIG. 6, the shaft 24 defines an open ended slot 48 at the second end 24B of the shaft 24. The slot 48 is sized and shaped to allow at least a portion of one cross member 22A of the barbeque grill 22 to pass there-into so as to allow the slotted second end 24B to extend past the barbeque grill 22 for the purposes of allowing the scrubbing head 14 to be mounted thereon. It will be appreciated that the scrubbing head 14, mounted on the shaft 24, is both rotatable about and axially movable along the shaft 24.

Figure 7:
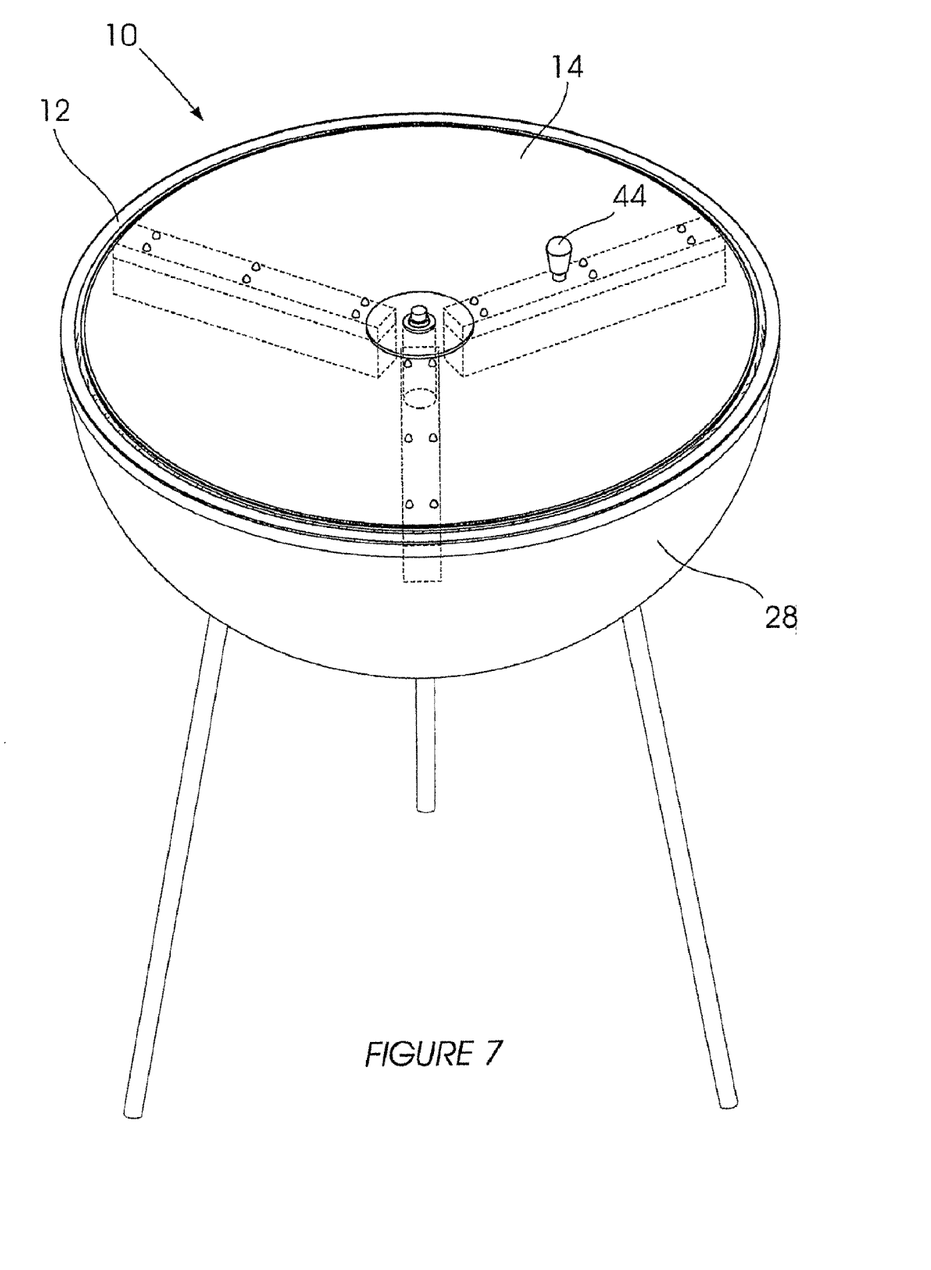
FIG. 7 shows a perspective view of the barbeque grill cleaning device, in use, relative to the barbeque.
Figure 8:
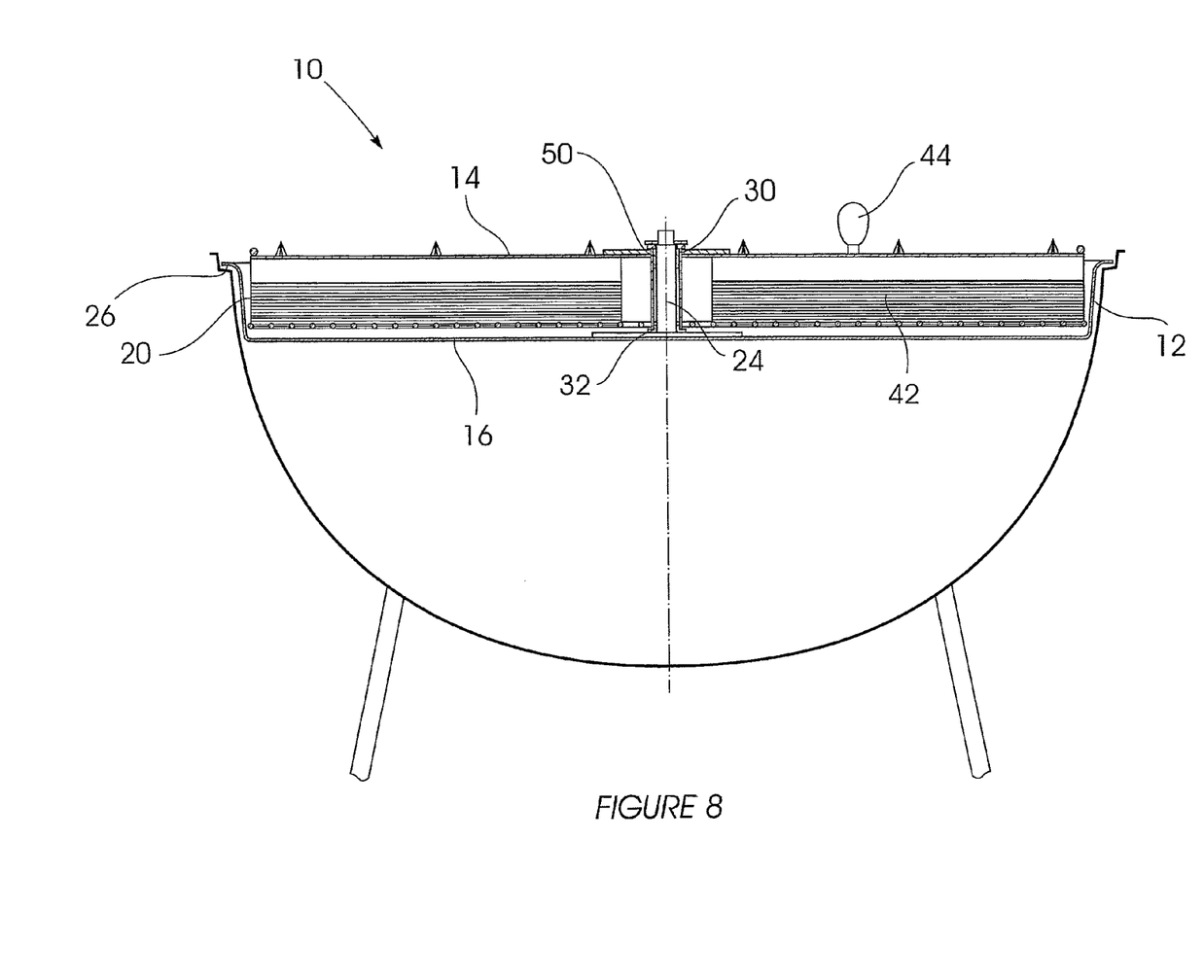
FIG. 8 shows a cross sectional side view of the barbeque grill cleaning device, in use, relative to the barbeque.

With the scrubbing head 14 mounted on the shaft 24, and with reference now to FIG. 7 and FIG. 8, the grill 22 is sandwiched between the base 16 of the container 12 and the scrubbing head 14, with bristles 42 in contact with the barbeque grill 22. In this position, a rotary motion transmitted to the scrubbing head 14 causes the bristles 42 to scrub the grill 22, thereby removing any remaining grit from the grill 22.

To maximise the scrubbing force of the bristles 42 on the barbeque grill 22, a downward force imparted to the scrubbing head 14 is transmittable to the bristles 42 as a result of the scrubbing head 14 being axially movable along the shaft 24. Rotation of the scrubbing head 14, about the shaft 24, is aided by a bush or bearing 50 positioned permanently either about the shaft 24 or in the bore 32 of the central body 30.

Figure 9:
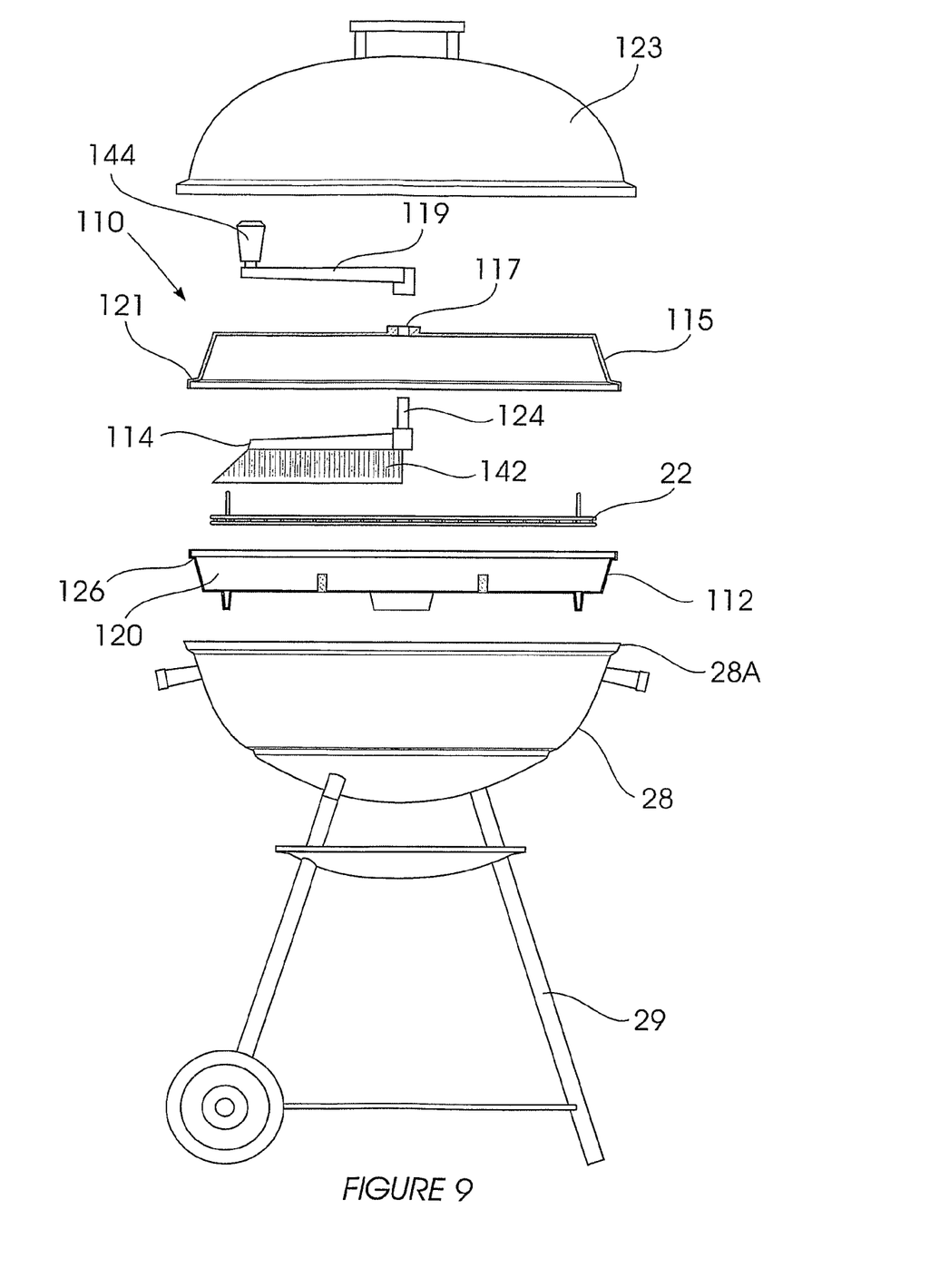
FIG. 9 shows a cross sectional exploded side view of another embodiment of the barbeque grill cleaning device as it would be positioned, for the purposes of use, relative to a barbeque and a barbeque grill.
Figure 10:
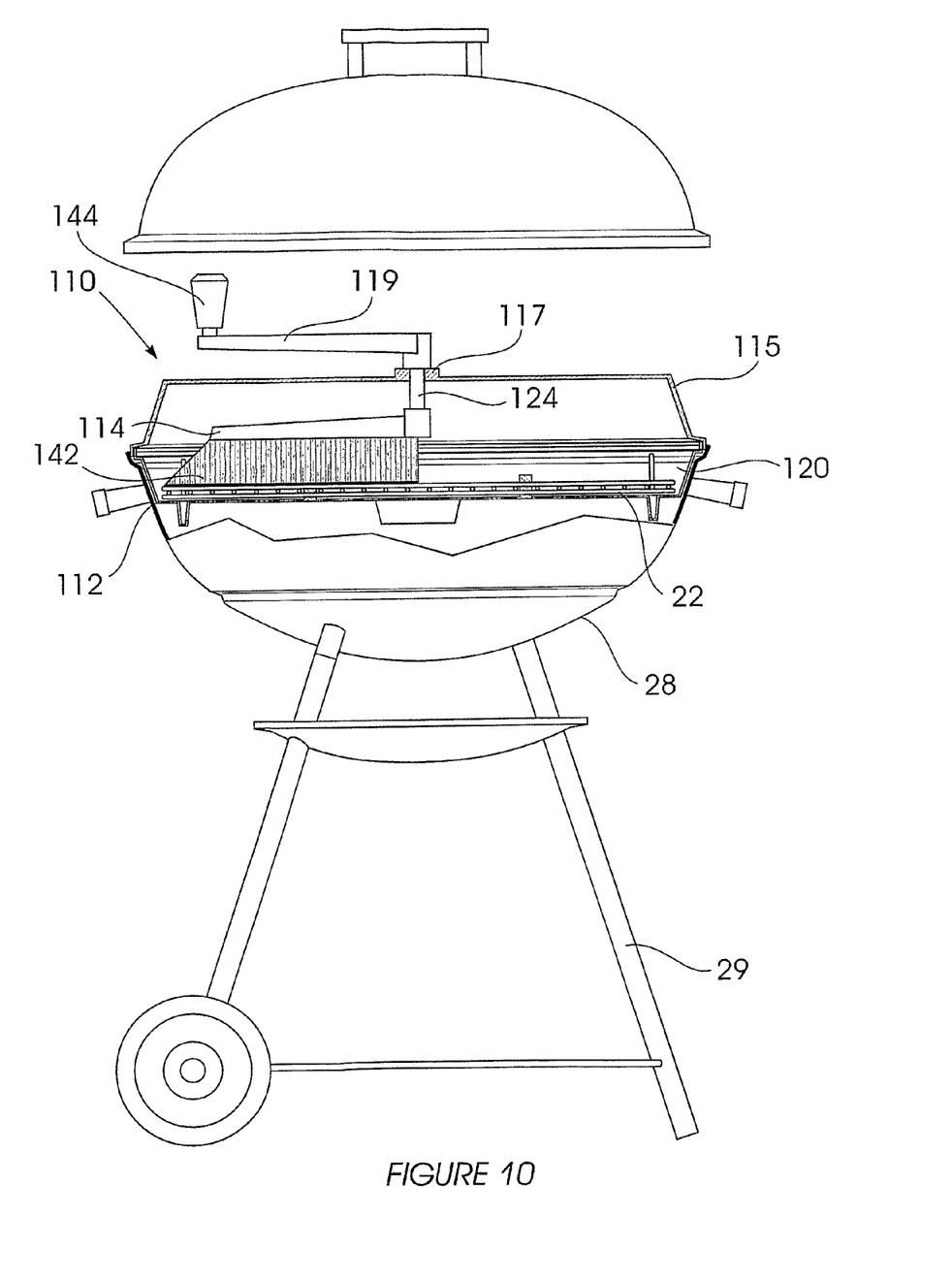
FIG. 10 shows a cross sectional side view of the barbeque grill cleaning device of FIG. 9, in use, relative to the barbeque.

In another embodiment of the invention, and with specific reference to FIG. 9 and figure 10, the barbeque grill cleaning device 110 comprises a container 112, a scrubbing head 114 and a housing member in the form of a lid 115.

The lid 115 defines a secondary shaft receiving formation in the form of a secondary shaft receiving bore 117 in which a shaft 124, extending form the central body 130 of the scrubbing head 114, is receivable. With the shaft 124 received in the secondary shaft receiving bore 117, a handle lever 119 is connectable to the upper end of the shaft 124 thereby capturing the lid 115 between the handle lever 119 and the scrubbing head 114 so as to form a scrubbing head assembly. A drive handle 144 is connected to the remote end of the handle lever 119 to impart a rotary motion thereto. It will be appreciated that with the scrubbing head assembly in its assembled condition, the scrubbing head 114 is rotatable and axially movable relative to the lid 115.

The container 112 comprises a supporting formation 126 being co-operative with the rim 28A of a drum portion 28 of a barbeque 29. Further, the lid 115 comprises a barbeque cover receiving formation 121 for receiving the cover 123 of a barbeque 29 such that the barbeque grill cleaning device 110 can be substantially housed in the barbeque 29 (i.e. wherein the majority of the barbeque grill cleaning device 110 is housed within the barbeque 29) as shown in FIG. 10.

Figure 11:
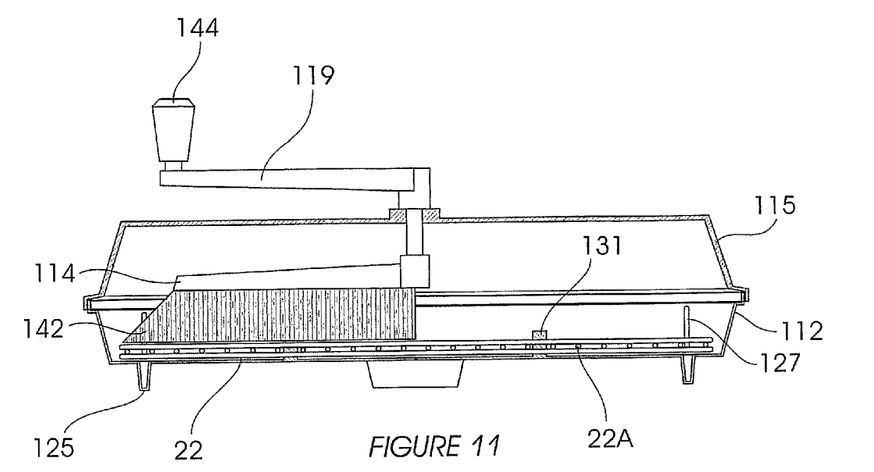
FIG. 11 shows a cross sectional side view of the barbeque grill cleaning device of FIG. 9 with the barbeque grill positioned therein in an upright orientation.
Figure 12:
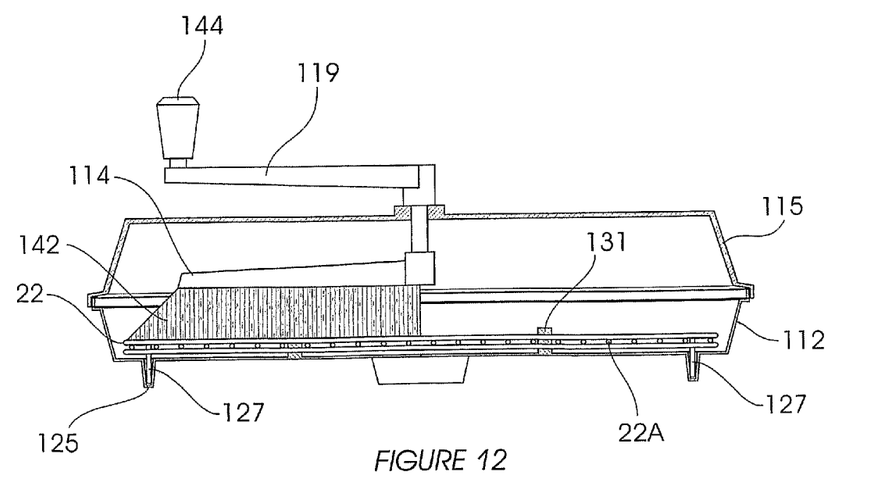
FIG. 12 shows a cross sectional side view of the barbeque grill cleaning device of FIG. 9 with the barbeque grill positioned therein in an up-side-down orientation.

In use, the scrubbing head assembly is removable from the container 12 thereby providing access to the container cavity 120 for introducing and/or removing the grill 22 there-from. With specific reference to FIG. 11 and FIG. 12, the container 112 further comprises a grill handle receiving formations 125 for receiving the handles 127 of the grill 22, thereby allowing the grill 22 to be positioned in the container 112 in an upright orientation as shown in FIG. 11, or an up-side-down orientation as shown in FIG. 12. As such, the upper and under sides of the grill 22 are capable of being scrubbed clean by the bristles 142 of the scrubbing head 114. Further, the container 112 comprises grill engaging formations 131 for engaging the cross bars 22A of the grill 22 so as to restrict the rotation of the grill 22 relative to the container 112 as a result of the force imparted onto the grill 22 by the scrubbing action of the scrubbing head 114.

Although the invention has been described above with reference to preferred embodiments, it will be appreciated that many modifications or variations of the invention are possible without departing from the spirit or scope of the invention.

The invention claimed is:

1. A barbeque grill cleaning device comprising:
    a container having a base and peripheral sidewalls extending from the base defining a cavity shaped and sized for receiving a barbeque grill therein; and
    a scrubbing head for scrubbing the barbeque grill, the scrubbing head being rotatable relative to the container, such that the cleaning of the barbeque grill is aided by a scrubbing action as a result of contact between the barbeque grill and the rotating scrubbing head;
    wherein the container comprises one or more grill handle receiving formations for receiving one or more handles extending from at least a first side of the grill, the grill being supportable on the base between a first orientation, wherein at least a portion of a second side of the grill is supported by the base thereby exposing the first side of the grill to the scrubbing action of the scrubbing head, and a second orientation, wherein at least a portion of the first side of the grill is supported by the base thereby exposing the second side of the grill to the scrubbing action of the scrubbing head, the handles of the grill positioned in the container in the second orientation being receivable within the grill handle receiving formations.

2. A barbeque grill cleaning device according to claim 1, wherein the grill handle receiving formations are one or more recesses defined in the base of the container.

3. A barbeque grill cleaning device according to claim 1, wherein the container comprises grill engaging formations for engaging at least a portion of the grill for the purposes of restricting the rotation of the grill relative to the container as a result of the force imparted onto the grill by the scrubbing action of the scrubbing head.

4. A barbeque grill cleaning device according to claim 3, wherein the grill engaging formations extend outwardly from the base of the container, the grill engaging formations being engageable with one or more of the cross bars making up the grill.

5. A barbeque grill cleaning device according to claim 1, wherein the container is supportable in or on a drum portion of a barbeque.

6. A barbeque grill cleaning device according to claim 5, wherein the container is supportable by the force of friction as a result of the direct contact between the container and the inner side walls of the drum portion of the barbeque.

7. A barbeque grill cleaning device according to claim 5, wherein the container comprises support formations co-operative with formations extending inwardly from the inner side walls of the drum portion on which the grill is normally supportable.

8. A barbeque grill cleaning device according to claim 7, wherein the support formations are one or more support tabs or support lips extending radially outwardly from the side walls of the container.

9. A barbeque grill cleaning device according to claim 8, wherein the support formations is a recess defined between the side walls of the container and the support lips extending there-from, in which a rim of the open upper end of the drum portion of the barbeque is receivable.

10. A barbeque grill cleaning device according to claim 5, wherein the container comprises support formations co-operative with a rim of the open upper end of the drum portion of the barbeque.

11. A barbeque grill cleaning device according to claim 5, wherein the container comprises a barbeque cover receiving formation for receiving the open bottom end of a barbeque cover thereby allowing the container to be housed substantially within the barbeque.

12. A barbeque grill cleaning device according to claim 11, wherein the container further comprises one or more handles.

* * * * *